United States Patent
Lu

(10) Patent No.: US 6,622,718 B1
(45) Date of Patent: Sep. 23, 2003

(54) THERMAL FLASK WITH A VACUUM SOLAR HEATING DEVICE

(76) Inventor: Chih-Min Lu, 4F, No. 193, Po-Kuan Rd., Taichung (TW)

( * ) Notice: Subject to any disclaimer, the term of this patent is extended or adjusted under 35 U.S.C. 154(b) by 0 days.

(21) Appl. No.: 10/242,543

(22) Filed: Sep. 12, 2002

(51) Int. Cl.$^7$ .................................................. F24J 2/04
(52) U.S. Cl. ...................... 126/640; 126/652; 126/675; 126/709; 220/592.27
(58) Field of Search .................................. 126/680, 640, 126/651, 652, 653, 655, 709, 704, 705, 659, 635, 636, 658, 675, 674; 220/592.2, 592.27; 215/12.1, 12.2

(56) References Cited

U.S. PATENT DOCUMENTS

| | | | | |
|---|---|---|---|---|
| 4,196,721 A | * | 4/1980 | Posnansky | 126/680 |
| 4,313,423 A | * | 2/1982 | Mahdjuri | 126/637 |
| 4,399,919 A | * | 8/1983 | Posnansky | 126/674 |
| 4,442,828 A | * | 4/1984 | Takeuchi et al. | 126/681 |
| 4,566,431 A | * | 1/1986 | Takeuchi et al. | 126/640 |
| 4,696,284 A | * | 9/1987 | Stowell | 126/640 |

\* cited by examiner

*Primary Examiner*—James C. Yeung
(74) *Attorney, Agent, or Firm*—William E. Pelton, Esq.

(57) ABSTRACT

A thermal flask has a body and a vacuum solar heating device. The solar heating device is detachably mounted on an opening defined in the hollow body. The vacuum solar heating device has a transparent tube, a connecting collar and a solar energy absorber. The tube has an inner wall, an outer wall, a closed end, an open end and a vacuum chamber defined between the inner and outer walls. The connecting collar is mounted on the open end of the tube and has an inner thread screwed onto an outer thread formed around the opening in the hollow body. The solar energy absorber is mounted in the tube to absorb solar energy and radiant heat. Accordingly, the vacuum solar heating device can heat the liquid in the flask, and the temperature of the liquid will be maintained for a desired long time while traveling.

7 Claims, 3 Drawing Sheets

THERMAL FLASK WITH A VACUUM SOLAR HEATING DEVICE

BACKGROUND OF THE INVENTION

1. Field of the Invention

The present invention relates to a container, and more particularly to a thermal flask with a vacuum solar heating device that can heat liquid in the flask by solar energy.

2. Description of Related Art

A thermal flask is a container that can be used to carry liquid. Flasks are vacuum-insulated to keep the liquid hot or cold for a long period of time. However, conventional flasks can only keep a liquid hot to the drink but cannot heat the liquid while traveling. The temperature of the liquid in the flask will gradually approach ambient temperature, and the heat preserving effect of the flask cannot be maintained for a desired extremely long time.

To overcome the shortcoming, the present invention provides a thermal flask with a vacuum solar heating device to mitigate or obviate the aforementioned problem, and utilizes the free and clean solar power.

SUMMARY OF THE INVENTION

The main objective of the invention is to provide a thermal flask with a vacuum solar heating device to heat the liquid by solar energy. The thermal flask in accordance with the present invention has a hollow body and a vacuum solar heating device. The vacuum solar heating device is detachably mounted on an opening defined in the hollow body. The vacuum solar heating device has a transparent tube, a connecting collar and a solar energy absorber. The tube has a closed end, an open end and a vacuum chamber defined around the tube. The connecting collar is mounted on the open end of the tube and has an inner thread screwed onto an outer thread around the opening in the hollow body. The solar energy absorber is mounted in the tube to absorb solar energy. The solar energy absorber can be a heating rod with two solar energy-absorbing plates mounted on the heating rod, or a solar energy coating coated on the tube. With such a vacuum solar heating device, the liquid in the flask can be heated so the temperature of the liquid can be maintained for a desired long time.

Other objects, advantages and novel features of the invention will become more apparent from the following detailed description when taken in conjunction with the accompanying drawings.

DETAILED DESCRIPTION OF PREFERRED EMBODIMENT

Figure 1:
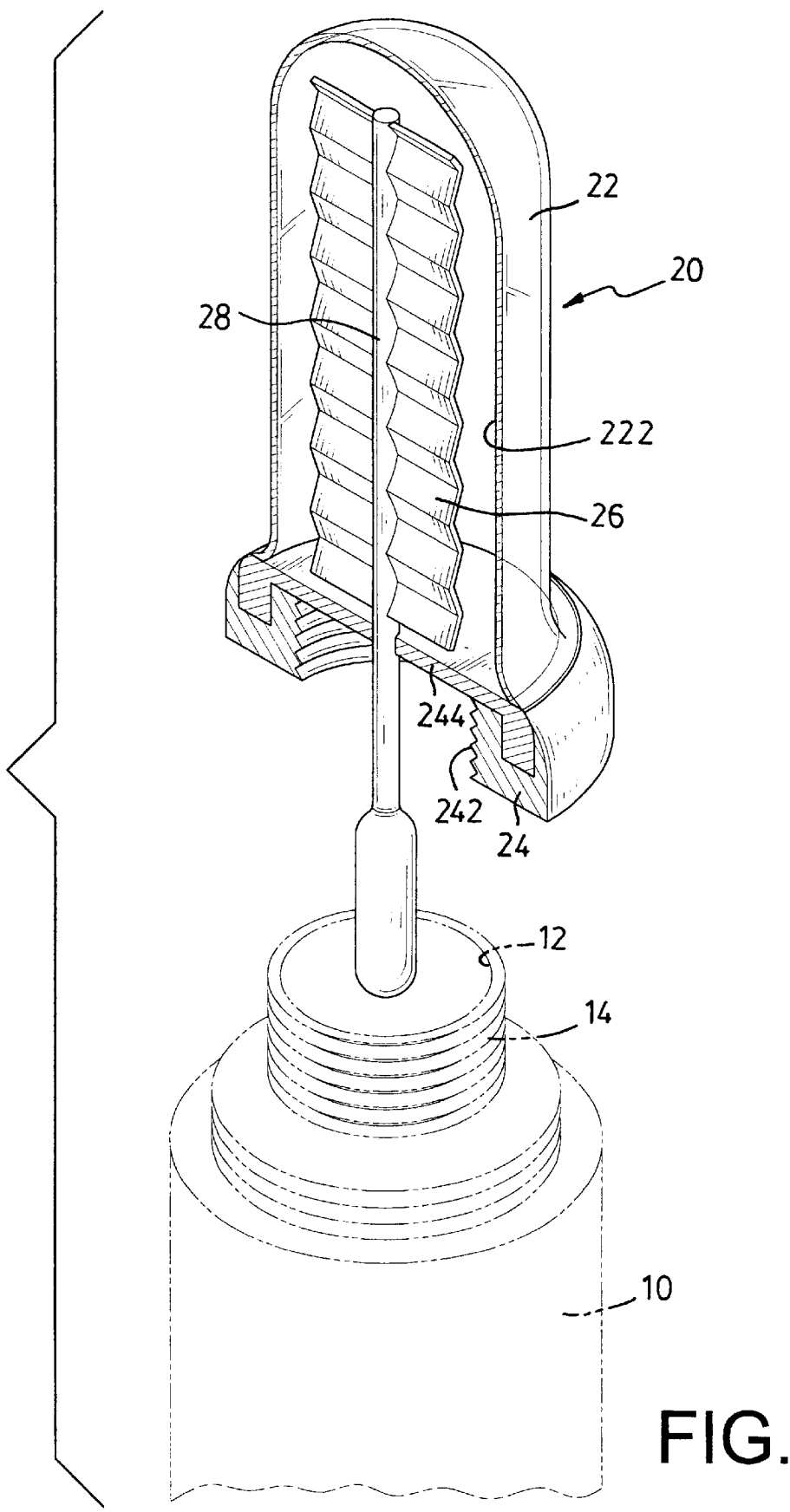
FIG. 1 is an exploded perspective view in partial cross section of a thermal flask with a vacuum solar heating device in accordance with the present invention.
Figure 2:
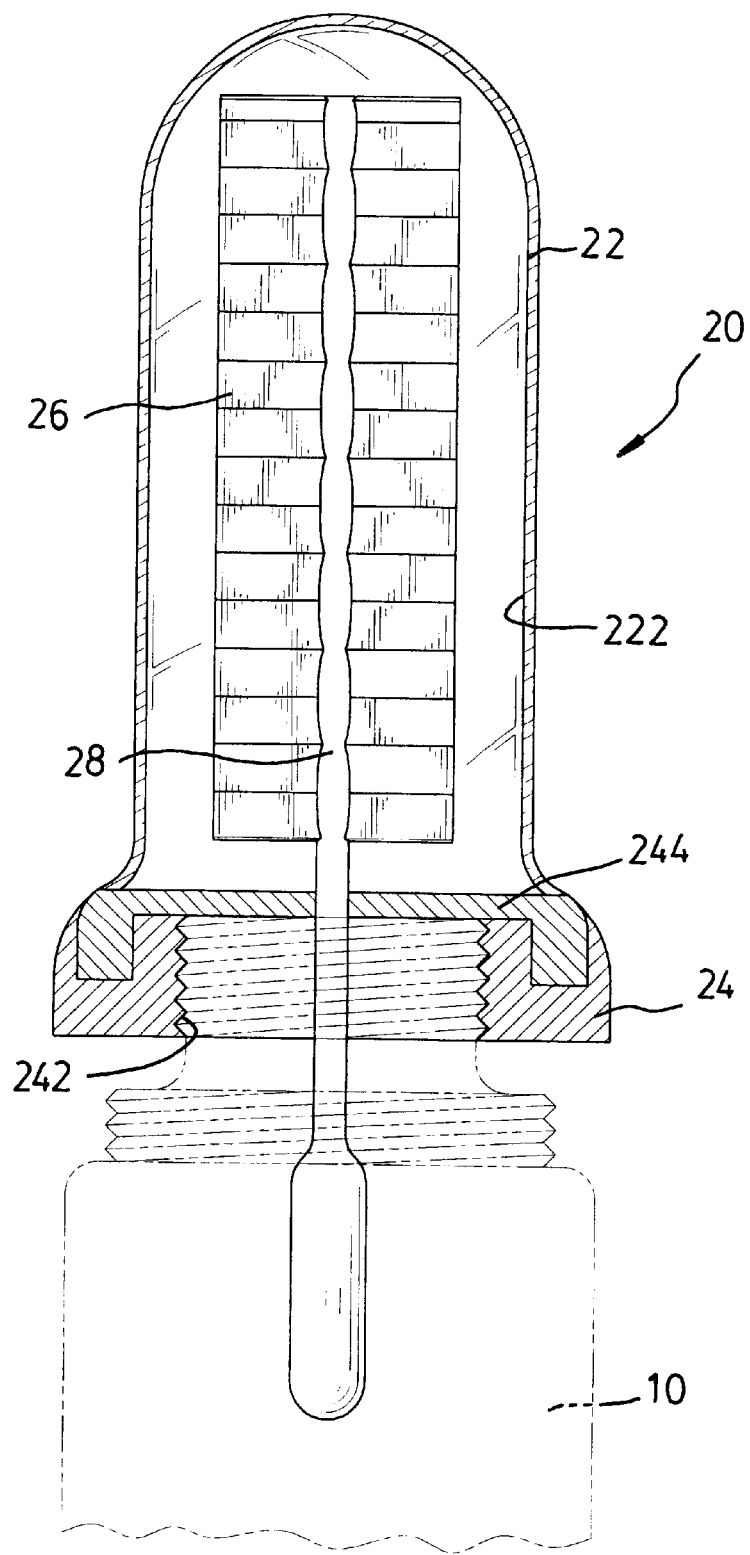
FIG. 2 is a side plan view in partial cross section of the thermal flask with the vacuum solar heating device in FIG. 1.

With reference to FIGS. 1 and 2, a thermal flask in accordance with the present invention comprises a hollow body (10) and a vacuum solar heating device (20). The hollow body (10) has an opening (12) defined in the body (10) and an outer thread (14) formed around the opening (12). The vacuum solar heating device (20) is detachably mounted on the opening (12) of the hollow body (10). The vacuum solar heating device (20) comprises a transparent tube (22), a connecting collar (24) and a solar energy absorber. The transparent tube (22) is made of glass and has a closed end and an opened end. The connecting collar (24) is securely attached to the opened end of the tube (22). A vacuum chamber (222) is defined between the tube (22) and the connecting collar (24). An inner thread (242) is formed in the collar (24) to screw onto the outer thread (14) on the hollow body (10). Thus, the tube (22) is detachably mounted on the body (10) by the engagement between the outer thread (14) on the hollow body (10) and the inner thread (242) in the connecting collar (24). The solar energy absorber is mounted in the tube (22) to absorb solar energy and the solar radiant heat to warm up the liquid. In a first embodiment, the solar energy absorber comprises two solar energy-absorbing plates (26) and a heating rod (28). The solar energy-absorbing plates (26) are respectively secured to opposite sides of the heating rod (28). In practice, each solar energy-absorbing plate has an undulating configuration to increase the area for absorbing the solar energy. The heating rod (28) extends into the hollow body (10). An isolation wall (244) is secured on one end of the connecting collar (24) away from the body (10) to close the end of the connecting collar (24) so as to define an vacuum chamber (222) between the tube (22) and the connecting collar (24). A through hole (not numbered) is defined in the wall (244) to allow the heating rod (28) to pass through the isolation wall (244). In the solar heating device (20), the solar energy-absorbing plates (26) absorb solar energy from the sun radiating through the transparent tube (22), and the solar energy absorbing plates (26) will be heated, which transmit the heat to the heating rod (28). The vacuum chamber (222) in the tube (22) serves as an insulator to keep the heat generated by the solar energy absorbing plates from escaping from the transparent tube (22). Consequently, the heating rod (28) extending into the body (10) will heat the liquid in the body (10), such that the liquid will be heated to a desired high temperature. Therefore, the temperature will be kept at a desired high temperature for a desired long time, and the flask can be effectively used in any environment where the sun shines.

Figure 3:
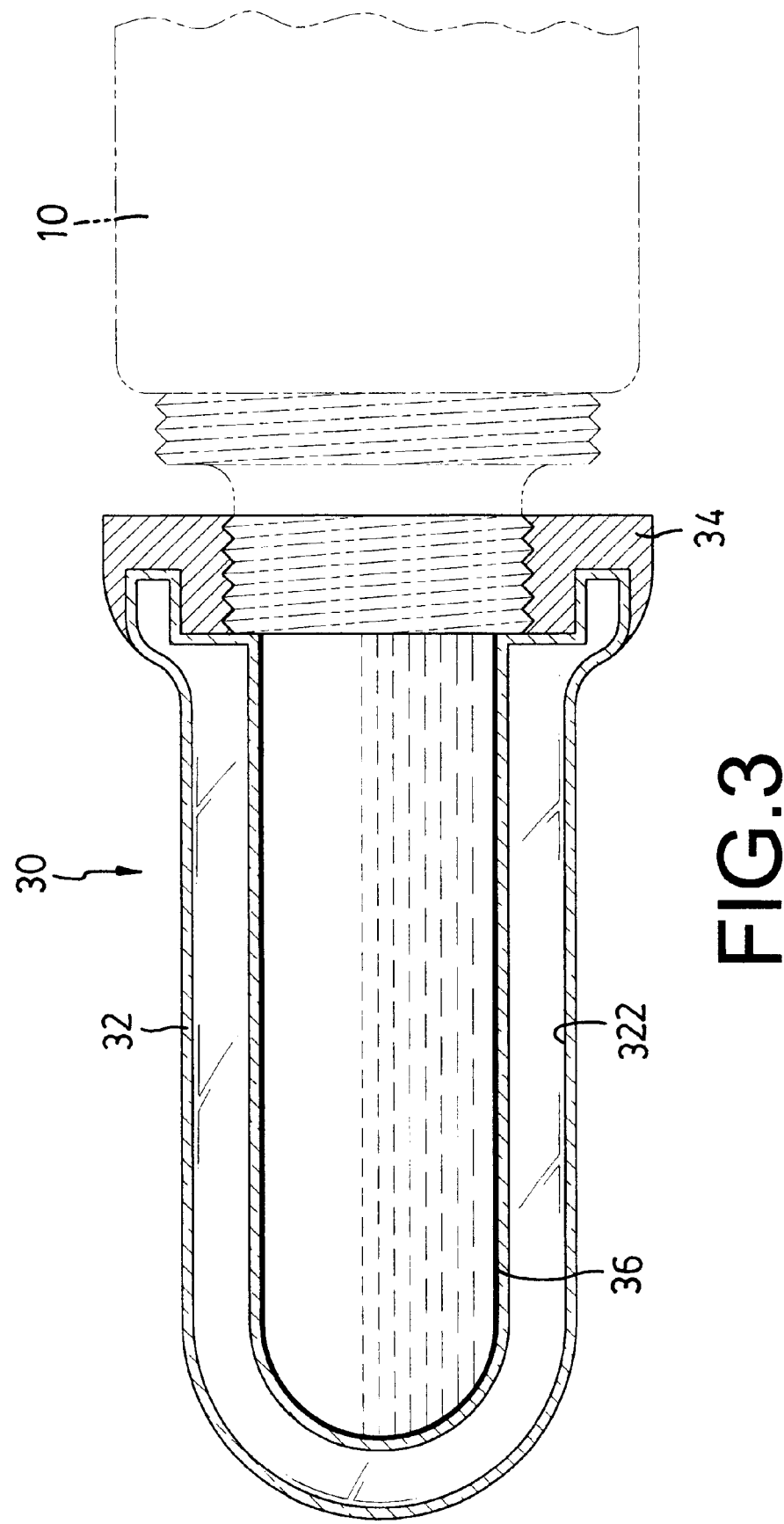
FIG. 3 is a side plan view in partial cross section of a thermal flask with another embodiment of a vacuum solar heating device in accordance with the present invention.

With reference to FIG. 3, a second embodiment of the solar heating device (30) comprises a transparent vacuum tube (32), a connecting collar (34) and a solar energy absorber. The tube has an inner wall, an outer wall and a vacuum chamber (322) formed between the walls. The inner wall has an inner surface. The solar energy absorber is an energy-absorbing coating (36) coated on the inner surface of the inner wall of the tube (32). The solar energy entering into the transparent tube (32) will be absorbed by the coating (36) and will be warmed up the liquid flowing into the tube (32). To heat the liquid in the body (10), the flask is laid down so some of the liquid will flow into the tube (32) through the connecting collar (34). Consequently, the liquid will be heated by the energy absorbed by the energy absorbing coating (36) and converted to heat. Consequently, the liquid will be kept at a desired high temperature for a desired long time.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A thermal flask with a solar heating device comprising:
   a hollow body with an opening defined in the body and having an outer thread formed around the opening; and
   a vacuum solar heating device detachably mounted on the opening of the hollow body, the vacuum solar heating device having:
   a transparent tube with a closed end and an open end and a vacuum chamber defined in the tube;
   a connecting collar mounted on the open end of the tube and having an inner thread formed in the collar to screw onto the outer thread on the hollow body; and
   a solar energy absorber mounted in the tube to absorb solar energy and convert the solar energy to heat.

2. The thermal flask as claimed in claim 1, wherein the solar energy absorber comprises
   a heating rod with a first end received in the tube and a second end extending into the hollow body; and
   two solar energy-absorbing plates mounted in the tube and secured on the heating rod.

3. The thermal flask as claimed in claim 2, wherein an isolation wall is secured on one end of the connecting collar to close the end of the connecting collar; and
   a through hole is defined in the wall for the heating rod pass through the isolation wall.

4. The thermal flask as claimed in claim 3, wherein the vacuum chamber is defined between the tube and the isolation wall of the connecting collar.

5. The thermal flask as claimed in claim 2, wherein each solar energy-absorbing plate has an undulating configuration.

6. The thermal flask as claimed in claim 1, wherein the solar energy absorber is an energy-absorbing coating covering an inner surface of the tube.

7. The thermal flask as claimed in claim 6, wherein the tube has an inner wall and an outer wall;
   the vacuum chamber is defined between the inner walls and the outer wall; and
   the energy-absorbing coating is coated on the inner wall of the tube.

* * * * *